Patented Feb. 6, 1951

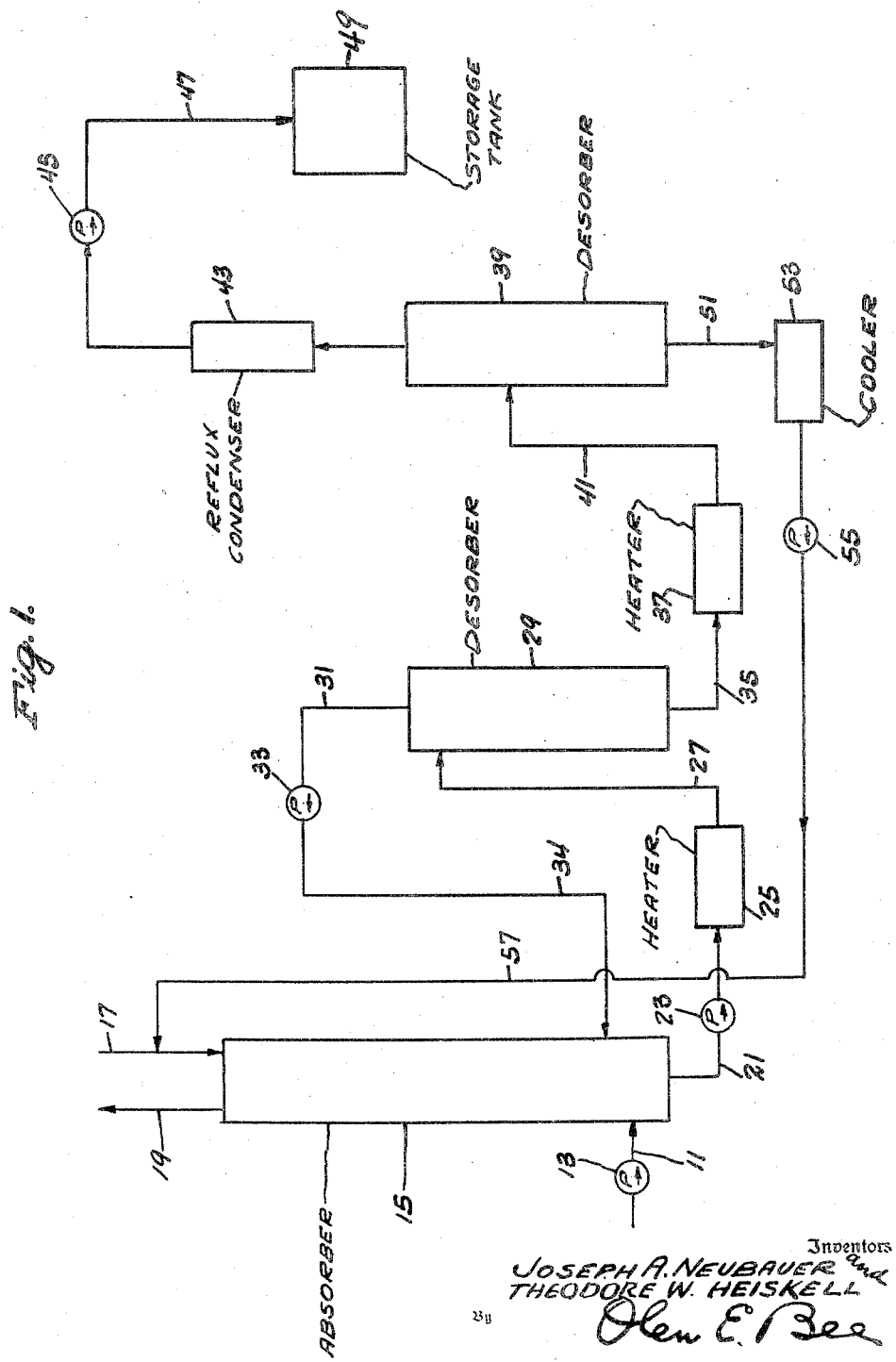

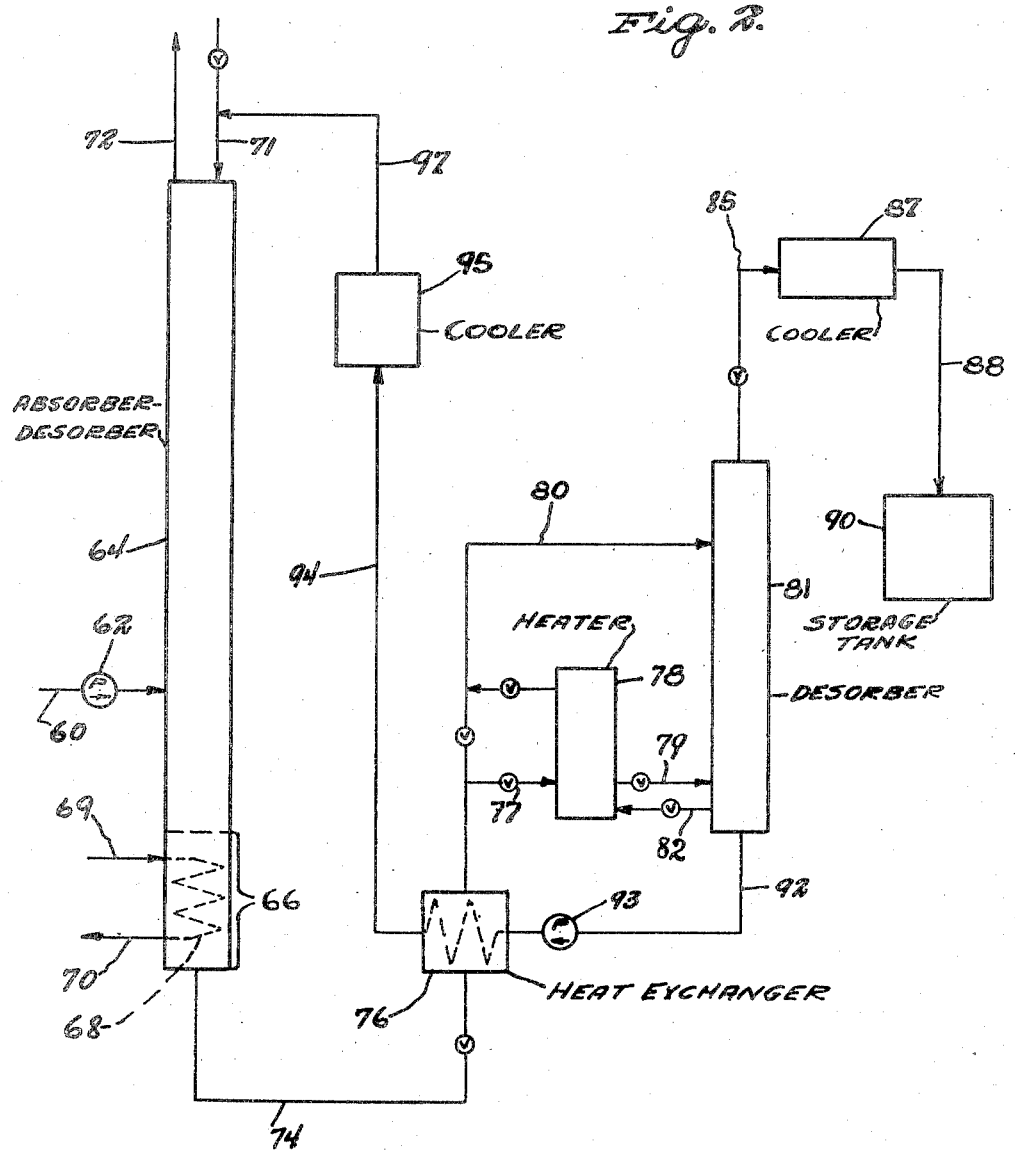

2,540,905

UNITED STATES PATENT OFFICE 2,540,905

RECOVERY OF CHLORINE

Joseph A. Neubauer, Pittsburgh, Pa., and Theodore W. Heiskell, New Martinsville, W. Va., assignors to Pittsburgh Plate Glass Company Application July 27, 1949, Serial No. 107,086

12 Claims. (Cl. 183—115)

This invention relates to a method of recovering a chlorine concentrate from chlorine mixtures which contain appreciable quantities of other gaseous agents. It particularly relates to the recovery of chlorine from gases which contain appreciable quantities of nitrogen and carbon dioxide such as the gaseous mixture which is obtained from an electrolytic cell in the electrolysis of sodium chloride to produce chlorine after a major portion of chlorine has been condensed therefrom.

An important commercial method for manufacturing chlorine is the electrolysis of sodium chloride in diaphragm electrolytic cells using carbon anodes, to form chlorine gas and sodium hydroxide. The gaseous chlorine thus obtained is treated to condense out a major portion of the evolved chlorine and to leave a residual gas which contains an appreciable amount, for example 5 percent, of the total chlorine production of the electrolytic cell. Much of this gas has heretofore been vented to the atmosphere thereby causing not only an economic loss but an air pollution problem as well. The gas contains in addition to chlorine, other reaction products such as carbon dioxide, carbon monoxide, hydrogen, oxygen, nitrogen and other gaseous components of air. The residual gas contains about 10 to 35 percent by weight chlorine.

Most of the various gaseous components alluded to above are insoluble in the chlorine solvents which may be used to recover chlorine by an absorption or scrubbing operation. However, carbon dioxide is relatively soluble in the solvents which are suitable chlorine absorbents and it naturally tends to contaminate the chlorine absorbed.

Thus when gaseous mixtures comprising chlorine and carbon dioxide are scrubbed with a chlorine solvent such as carbon tetrachloride, both carbon dioxide and chlorine are dissolved in the solvent. Consequently, the chlorine removed from the solvent is contaminated with carbon dioxide, frequently to an extent such as to render the chlorine extremely dilute.

In accordance with this invention it has been found that chlorine in a concentrated state, for example 95 to 98 percent by weight chlorine or higher, may be obtained from chlorine-containing mixtures even when the chlorine is contaminated with carbon dioxide in the mixture, by scrubbing the mixture with a stable, liquid, halogenated hydrocarbon at a temperature sufficiently low to dissolve a substantial amount of the chlorine and a quantity of the carbon dioxide, desorbing a major portion of the dissolved carbon dioxide and a portion of the dissolved chlorine, for example by desorption at a higher temperature but below that temperature at which substantially all of the chlorine escapes, and thereafter separately desorbing the remaining chlorine from the solution, for example at a still higher temperature.

Thus it has been discovered that when a solution comprising chlorine and carbon dioxide in a chlorine solvent such as pentachloropropane is desorbed at a temperature such that most of the chlorine is released, both chlorine and carbon dioxide desorb simultaneously to produce a mixture of these gases.

However, it has been found according to this invention that if the solution is desorbed at a lower temperature, a greater proportion of carbon dioxide than chlorine is desorbed so that a mixture of chlorine and carbon dioxide is desorbed from the solution, leaving a chlorine solution which contains a lower proportion of carbon dioxide to chlorine or even no appreciable amount of carbon dioxide. The mixture of chlorine and carbon dioxide may be recycled for further scrubbing and the thus treated chlorine solution may be heated to release chlorine in a quite pure state.

It has been discovered according to this invention that certain of the higher chloropropanes, particularly those which contain at least five chlorine atoms, such as the normally liquid pentachloro-, hexachloro- and heptachloropropanes are especially good solvents. These solvents are particularly valuable since little or none of the solvent becomes lost through vaporization during the scrubbing operation.

1,1,1,2,2,3,3 heptachloropropane which has a boiling point of 247° C. and 1,1,1,2,3,3,3 heptachloropropane which boils at 249° C. at standard pressure are examples of chlorine solvents which may be employed in practicing the invention. Although these compounds normally exist as solids at 0° C., they become liquids at 29.4° C. and 11.5° C. respectively and may be used at absorption temperatures in excess of their respective freezing points, or they may be mixed with other compatible materials in such proportions that the resultant mixture is a liquid in the preferred absorption temperature range.

1,1,2,2,3,3 hexachloropropane and 1,1,1,2,3,3 hexachloropropane which boil at 218° C. and 216° C. respectively are further examples of the higher chloropropanes which may be used. These materials differ from the heptachloropro-derivatives of propane in that they are liquid at the temperatures and pressures of the preferred absorption operation. The octachloropropane $C_3Cl_8$ is a solid at ordinary temperatures, melts at 160° C., and boils at 268° C. While it is impracticable to use this material alone in an absorption process requiring a liquid absorbent in the temperature range of minus 10° C. to 20° C. the compound may be dissolved in a solvent in such amounts that the solution of octachloropropane remains liquid at preferred operating temperatures.

A mixture of chloropropanes manufactured by Hooker Electrochemical Company is suitable for use in the practice of the invention. This mixture is comprised of the following chloropropanes:

| | Parts by weight |
|---|---|
| Pentachloropropane | 0–5 |
| Hexachloropropane | 40–50 |
| Heptachloropropane | 40–50 |
| Octachloropropane | 0–5 |

Although the several tetrachloropropanes are more volatile than the more highly chlorinated penta-, hexa- and heptachloro derivatives, they are all liquids at the preferred absorption temperatures and may be utilized in the process. 1,1,1,2 tetrachloropropane, B. P. 152° C., 1,1,2,2 tetrachloropropane, B. P. 153° C., and 1,1,2,3 tetrachloropropane B. P. 179–180° C. are chlorine solvents which are adaptable to the recovery process.

The several trichloropropanes, 1,1,1 trichloropropane, 1,1,2 trichloropropane, 1,1,3 trichloropropane, 1,2,2 trichloropropane and 1,2,3 trichloropropane boil in the range of 123°–150° C. These isomeric forms are all liquids at the temperatures contemplated in the absorption of chlorine from gaseous chlorine-containing mixtures.

The di-substituted chlorine derivatives of propane are liquids which boil in the range of from 70°–120° C. 1,1 dichloropropane, 1,2 dichloropropane, 1,3 dichloropropane and 2,2 dichloropropane are all solvents which may be used. Although they are relatively volatile and consequently would be prone to escape more readily from the system during processing, these solvents may be used alone or in conjunction with higher boiling chlorine absorbents to recover chlorine.

The chlorinated propanes containing less than four chlorine atoms have a tendency to add chlorine to form more highly chlorinated compounds where they are used to absorb chlorine from gaseous mixtures. Hence it is preferable to employ the chlorinated propanes containing four or more chlorine atoms since these compounds do not become chlorinated as readily. However, the less chlorinated materials may be used when it is indicated that they will form suitable chlorine absorbents through the absorption of chlorine from the chlorine-containing gases. For example, a recognized method of manufacturing 1,1,2,3 tetrachloropropane is the reaction of chlorine with 1,1,2 trichloropropane in the presence of aluminum chloride. Consequently, the trichloro- compound may be used as the initial chlorine absorbent even though a certain amount of the tetrachloro- derivative may be formed by chlorine addition or direct chlorination.

Chlorinated normal and isobutanes may also be used as solvents in the chlorine recovery process contemplated. The following compounds are liquids at the preferred absorption temperatures and are capable of absorbing chlorine from chlorine-bearing gases: 1,2 dichlorobutane, B. P. 124° C.; 1,4 dichlorobutane; 2,3 dichlorobutane, B. P. 115° C.; 1,2,2,3 tetrachlorobutane, B. P. 85° C.; hexachlorobutane prepared from isobutyliodide by reaction with chlorine; $a,a$ dichloroisobutane B. P. 103–105° C.; $a,\beta$ dichloroisobutane B. P. 107–108° C.; 1,1,1 trichloro-2-methyl propane; $a,a,\beta$ trichloroisobutane, B. P. 160° C.; tetrachloro-; pentachloro- and hexachloroisobutane, all of which are liquids at ordinary chlorine recovery temperatures.

Some of the chlorinated pentanes and hexanes are good solvents for the absorption of chlorine in this process. The mono- and dichloropentanes and the mono- and dichloroisopentanes are liquids boiling between 75°–120° C. Trichloro-2 methylbutane, B. P. 180° C. and tetrachloro- 2 methylbutane B. P. 220° C. are also suitable. 1 chlorohexane, 2 chlorohexane, and 1,5 dichlorohexane are liquids which may be employed in the absorption process.

The more common saturated chlorine-containing solvents such as chloroform, carbon tetrachloride and dichloromethane may also be used as chlorine absorbents in the process hereinafter described in detail.

Furthermore, mixtures of two or more chlorine solvents may be prepared. If mixtures containing the higher chloro-substituted alkanes such as the hexa-, hepta- and octachloro- compounds contain undesirable solids at preferred operating temperatures, these may be removed by various means such as crystallization, for example, prior to using the solvent mixture in the recovery process.

1,1,2,3,3 pentachloropropane which also may be used is a condensation reaction product of chloroform and symmetrical cis dichloroethylene. A quantity of this pentachloropropane was prepared by the following method:

Analytical grade chloroform was washed four times with an equal weight of water to remove the alcohol which had been added by the manufacturer as a stabilizer, and was dried over calcium chloride. The dried chloroform was heated for fifteen minutes at its boiling point under total reflux with 1% by weight of anhydrous resublimed aluminum chloride and was fractionally distilled. The distillate boiled at 60° C. at 744 millimeters of mercury.

The symmetrical cis dichloroethylene was purified in the following manner:

A commercial grade of this material was fractionated in a silvered vacuum-jacketed column giving a 95% yield of material having a specific gravity of $$1.2615 \frac{61° C.}{60° C.}$$

This was heated with a quantity of aluminum chloride constituting 3% of the weight of the dichloroethylene to a maximum temperature of 40° C. under total reflux for 30 minutes. An intensely colored purple liquid resulted from treatment. This liquid was steam-distilled, separated from water by gravity, filtered and was then fractionally distilled. The purified symmetrical cis dichloroethylene recovered was 82.4% of the original weight of the commercial material.

Each of these specially purified reagents described above was heated separately for about 15 minutes under reflux with about 2% of their weights of aluminum chloride. The chloroform was heated to boiling while the dichloroethylene was heated to about 40° C.

A mixture of equal mol weights of the thus treated chloroform and symmetrical cis dichloroethylene and 3% by weight of aluminum chloride was heated to about 48° C. under reflux, until reaction proceeded by its own exothermic heat. This induction period varied from 30 to 90 minutes after which the temperature rose spontaneously with copious emission of HCl. The reaction was kept under control by externally cooling the reaction vessel with a stream of water sufficient to maintain the temperature of the reaction mixture at about 56° C. The reaction period averaged 45 minutes. After that time the temperature of the mixture was raised to 60° C. until the evolution of HCl ceased and the reaction was assumed to have been completed.

1,1,2,3,3 pentachloropropane was separated from the reaction mixture by steam distillation and was dried over calcium chloride.

In the process initially described above some cooling of the mixture during the reaction period to prevent the temperature of the mixture from exceeding about 56° C. is desirable in order to improve the yield of the product.

The 1,1,2,3,3 pentachloropropane thus purified had the following general properties:

| | |
|---|---|
| Color | Colorless |
| Specific gravity | $1.608 \frac{34° C.}{4° C.}$ |
| Boiling range | 198–201° C. |
| Freezing point | Lower than 10° C. |
| Index of refraction | 1.5131 |

The invention may be described with reference to the accompanying drawings which illustrate two preferred embodiments of the invention in which:

Fig. 1 shows a flow plan illustrating one embodiment of the invention, and

Fig. 2 shows a flow plan illustrating another embodiment of the invention.

In Fig. 1 a gaseous mixture containing chlorine, hydrogen, carbon dioxide, carbon monoxide, air, oxygen and traces of other gases is introduced through a line 11 from a source not shown and is forced by a positive pressure pump 13 into the bottom of an absorption vessel 15. This vessel is preferably constructed of chlorine-resistant metal, is cylindrical in shape with the cylindrical axis vertical and may be packed with rings or discs made of refractory materials to provide a greater surface area within the vessel and improved contact between the gas and the solvent.

At the same time as the gas is being introduced at the bottom of the absorption vessel, a chlorine solvent, such as the above mentioned pentachloropropane, which has been cooled to a temperature below about 40° C., preferably minus 15 to plus 20° C. is introduced at the opposite end of the vessel through line 17 and flows in a countercurrent direction over the packing rings downwardly to the bottom section. Although the internal temperature of the absorber should be maintained at a relatively low level to insure maximum absorption of chlorine by the chlorine solvent, a temperature in the range of from about minus 15° C. to plus 40° C. is satisfactory. Conventional means (not shown) may be used for cooling the absorption vessel or scrubber.

Since the chlorine solvent has a particular absorption affinity for the chlorine phase of the mixed gases but a poor affinity for most of the other components except $CO_2$, the undissolved gases pass out of the top of the absorber through line 19 to waste. The solvent which has been contacted with the mixture of gases in the absorption vessel now contains dissolved chlorine and carbon dioxide and passes through line 21 where by means of a positive pressure pump 23 it is forced through a heater 25 where the temperature is increased to a point ranging preferably from 50° C. to 100° C., preferably not above 85° C.

The pentachloropropane is then delivered by line 27 to a closed vessel 29 which may be designated as a recycle flash desorption tank. Since the temperature of the resulting solution has been considerably elevated by the prior heating operation, a substantial portion of the carbon dioxide which has been absorbed by the liquid is flashed therefrom and passes in gaseous form through line 31. Since the temperature of the solvent is elevated above the chlorine absorption temperature it is inevitable that a certain amount of gaseous chlorine also will be flashed from the liquid and this passes through line 31 with the carbon dioxide. By means of pump 33 the gaseous mixture of carbon dioxide and chlorine is forced through the line 34 at a superatmospheric pressure, for example about 6 pounds per square inch gauge, and re-enters the base of the absorption vessel 15 where it is further contacted with additional chlorine solvent simultaneously with further quantities of gas from the electrolytic cells.

The liquid solvent remaining but containing a large portion of the $Cl_2$ originally absorbed, is conducted by line 35 from the desorption flash tank through a heater 37 which elevates the temperature of the liquid to a much higher temperature, for example above at least 90° C. but below the boiling point of the solvent. If the chlorine-containing solvent is heated to a temperature in excess of the boiling point of the solvent a considerable quantity of HCl may be formed and this may be difficult to remove from the chlorine.

A similar desorption flash tank which I designate as a chlorine desorption flash tank 39 is provided and the heated solution enters this vessel through line 41. The chlorine gas is flashed from the liquid, and the vaporized solvent condensed and refluxed by reflux condenser 43, while the recovered chlorine is withdrawn by pump 45 through line 47 into an appropriate chlorine storage vessel 49. The liquid solvent passes from the desorption vessel through line 51 into cooler 53 where the temperature is reduced by appropriate cooling means to that temperature at which the initial absorption reaction is to be conducted and by means of pump 55 is returned through line 57 to the top of absorption vessel 15.

Referring to Fig. 2 another embodiment of the invention is shown in which the absorption and initial desorption steps are effected in one tower. A gaseous mixture containing chlorine, hydrogen, carbon dioxide, carbon monoxide, air oxygen and traces of other gases is introduced through a line 60 from a source not shown and is forced by a positive pressure pump 62 into the lower third of an absorption-desorption tower 64. This tower is preferably constructed of chlorine-resistant metal, is cylindrical in shape with the cylindrical axis vertical and may be packed with rings or discs made of refractory materials to provide a greater surface area within the vessel and improved contact between the gas and the chlorine solvent. The bottom section 66 of the tower 64 is constructed to hold a pool of the liquid solvent and is provided with heating means 68 which is heated by steam entering through line 69, passing through tubes of the heater in the bottom section 66 and the steam or steam condensate leaving through line 70. Other conventional means may be employed to heat this bottom section 66.

As the gas is introduced in the lower section of the tower, preferably just above the bottom section 66, a chlorine solvent, such as pentachloropropane or other chloro hydrocarbon which has been cooled to a temperature below about 40° C., for example minus 7° C., is introduced at or near the top of the vessel. The solvent enters through line 71 and flows in a countercurrent direction to the gas over the rings downwardly to the bottom section. As the solvent passes the rising gas, chlorine and carbon dioxide are absorbed therein as described above in conjunction with Fig. 1. The solvent then passes into the bottom section 66 and is heated to such a temperature, for example 50-100° C., that a large portion or all of the effectively releasable carbon dioxide plus some portion of absorbed chlorine are driven off, a temperature of 75-85° C. being suitable for the purpose. A temperature differential will be maintained throughout the tower. The gas thus driven off, containing carbon dioxide and chlorine, then rises in the tower. During its ascent the chlorine released from the solvent is reabsorbed by the downward flowing solvent so that when the gas reaches the top it contains virtually no chlorine. A small amount of carbon dioxide will of course be absorbed in and retained by the solvent and this will remain in the system. The carbon dioxide and other insoluble gases are taken from the tower through line 72.

The liquid solvent which contains no effective amount of carbon dioxide but contains most of the chlorine originally absorbed, is conducted by line 74 from the bottom section 66, through a heat exchanger 76. From the heat exchanger, the heated solvent is conducted, part through line 77 to a heater 78 thence through line 79 and the other portion through line 80, to a desorption flash tank 81. The solvent temperature before entering the desorption tank 81 is raised to a temperature at least above 90° C. and preferably below the boiling point of the solvent. The solvent entering the desorption flash tank through line 77 is at a higher temperature than that entering through line 79. A portion of the solvent in the bottom of the tank 81 passes back to the heater through line 82 where it is reheated and returned to the tank through line 79. When the heated solvent enters the desorption tank 82 the chlorine gas is flashed from the solvent and leaves the tank through line 85 to a cooler 87 and thence through line 88 to a suitable chlorine storage vessel 90. The liquid solvent passes from the desorption flash tank by means of line 92 to a pump 93 from where it is pumped through the heat exchanger 76 and is cooled. From the heat exchanger the cooled solvent passes by means of line 94 through a cooler 95, and finally through line 97 back to line 71 to re-enter the tower 64.

In order to facilitate chlorine absorption, it is frequently advantageous to conduct the absorption in tower 64 at a superatmospheric pressure, for example above 10 pounds per square inch gauge, suitable pressure being 30 pounds per square inch gauge. In such a case, the pressure may be released completely or partially when the solvent is transferred to flash tower 81 so that desorption of chlorine occurs at a lower pressure.

By effecting the absorption at a superatmospheric pressure, and desorption at a lower pressure, it is possible to effect a more complete separation of chlorine from carbon dioxide, since the increase of solubility of chlorine at higher pressures is more marked than the increase of carbon dioxide at such pressures.

Although the preferred embodiments of the invention have been described with reference to the more highly chlorinated propanes, other normally liquid hydrocarbon halides such as the chlorides, fluorides and chlorofluorides may be employed. Generally, chlorine solvents boiling at a temperature in excess of 75° C., preferably in excess of 100° C. are suitable.

The absorption of chlorine from the gaseous mixture by means of the higher boiling hydrocarbon halides is usually carried out at a temperature below 40° C., and preferably below 10° C. for reasons hereinbefore mentioned. The first stage of desorption is generally performed at a temperature above 50° C. in the range of from 50° C. to about 100° C. The temperature of the solvent should be elevated at least 10° to 20° C. higher than that prevailing during the chlorine absorption operation.

The second desorption should be conducted at a temperature which is at least 10° to 20° C. higher than that at which the solvent is maintained during the initial desorption. Usually the temperature is elevated to 125° C. or higher for the chlorine solvents which boil at 125° C. or higher, but when lower boiling solvents such as carbon tetrachloride or others are employed the temperature will of course be much lower. The final desorption may be carried out at the boiling point of the solvent but as a rule, HCl is formed at such a temperature and the chlorine is contaminated to a certain degree.

It will readily be apparent that a continuous process is not the only method contemplated by the invention. A batch process wherein the desorbed solvent is simply pumped to storage for future use, or where it is employed for other purposes is obviously within the scope of the invention. A multi-stage desorption process having more than two desorption phases also may be carried out in accordance with the teachings of the invention.

Although reference has been made to the preferred embodiment wherein the chlorine-containing solvent is successively stripped of carbon dioxide and chlorine by a transferal of the solvent to various desorbing vessels, it is obvious that a similar result could be achieved by absorbing and desorbing in a single vessel by lowering and raising the temperature in accordance with the designated preferred values hereinbefore stated.

It is not intended that the use of the processes herein described be confined solely to the recovery of chlorine from chlorine-containing gases produced in the electrolysis of sodium chloride. Obviously the various solvents may be adapted to the recovery of chlorine from other gaseous mixtures containing 10 percent or more by weight chlorine and chlorine may be recovered by the methods which have been outlined.

Although the present invention has been described with reference to certain details of specific embodiments, it is not intended that such details shall be regarded as a limitation upon the scope of the invention except insofar as included in the accompanying claims.

We claim:

1. A method of recovering chlorine from a gaseous mixture containing chlorine and carbon dioxide which comprises scrubbing the mixture with a stable liquid halogenated hydrocarbon, desorbing a major portion of the dissolved carbon dioxide and a portion of the dissolved chlorine, and thereafter separately desorbing a further portion of chlorine from the solution.

2. A method of recovering chlorine from a gaseous mixture containing chlorine and carbon dioxide which comprises scrubbing the mixture with a stable liquid halogenated hydrocarbon at a temperature sufficiently low to dissolve chlorine and a quantity of carbon dioxide, desorbing a major portion of the dissolved carbon dioxide and a portion of the dissolved chlorine at a higher temperature but below that at which substantially all the chlorine escapes and thereafter separately desorbing a further portion of chlorine from the solution at a still higher temperature.

3. The process as described in claim 2 wherein the halogenated hydrocarbon is a liquid chloropropane having at least four chlorine atoms.

4. A method of recovering chlorine from a gaseous mixture containing chlorine and carbon dioxide which comprises scrubbing the mixture at a temperature of from about minus 15° C. to about 40° C. with a stable liquid halogenated hydrocarbon, desorbing a major portion of the dissolved carbon dioxide and a portion of the dissolved chlorine at a temperature which is at least 10° C. higher than the absorption temperature and thereafter separately desorbing a further portion of chlorine from the solution at a temperature which is at least 10° C. higher than the initial desorption temperature.

5. A method of recovering chlorine from a gaseous mixture containing chlorine and carbon dioxide which comprises scrubbing the mixture with a stable liquid halogenated hydrocarbon having at least three carbon atoms and at least five halogen atoms, at a temperature sufficiently low to dissolve chlorine and a quantity of carbon dioxide, desorbing a major portion of the dissolved carbon dioxide and a portion of the dissolved chlorine at a higher temperature but below that at which substantially all the chlorine escapes, and thereafter separately desorbing a further portion of chlorine from the solution at a still higher temperature.

6. A method of recovering chlorine from a gaseous mixture containing chlorine and carbon dioxide which comprises scrubbing the mixture with a stable liquid halogenated hydrocarbon at a superatmospheric pressure and at a temperature sufficiently low to dissolve chlorine and a quantity of carbon dioxide, desorbing a major portion of the dissolved carbon dioxide and a portion of the dissolved chlorine at a higher temperature but below that at which substantially all the chlorine escapes, and thereafter separately desorbing a further portion of chlorine from the solution at a lower pressure.

7. A method of recovering chlorine from a mixture containing chlorine and carbon dioxide dissolved in a stable liquid halogenated alkane which comprises heating the mixture to a temperature at which a major portion of the dissolved carbon dioxide and a portion of the chlorine is desorbed from the mixture but below the temperature at which substantially all chlorine escapes, and thereafter removing the dissolved chlorine at a higher temperature.

8. A method of recovering chlorine from a gaseous mixture containing chlorine and carbon dioxide which comprises countercurrently contacting an upwardly flowing gas stream comprising chlorine and carbon dioxide with a downwardly flowing stream of a stable liquid chlorinated hydrocarbon at a temperature at which chlorine and carbon dioxide in said liquid will dissolve, collecting a pool of the downwardly flowing liquid below the zone of said contact, heating said pool to a temperature above absorption temperature at which carbon dioxide and some chlorine is driven off and passing the carbon dioxide and chlorine thus driven off to said downwardly flowing stream.

9. A method of recovering chlorine from a gaseous mixture containing chlorine and carbon dioxide which comprises countercurrently contacting an upwardly flowing gas stream comprising chlorine and carbon dioxide with a downwardly flowing stream of a stable liquid chlorinated hydrocarbon at a temperature below 40° C., collecting a pool of the downwardly flowing liquid below the zone of said contact, heating said pool to a temperature of 50–100° C. and passing off carbon dioxide and some chlorine to contact the downwardly flowing hydrocarbon.

10. A method of recovering chlorine from a gaseous mixture containing chlorine and carbon dioxide which comprises scrubbing the mixture with liquid 1,1,2,3,3 pentachloropropane, at a temperature of from about minus 15° C. to about plus 40° C. to dissolve chlorine and a quantity of carbon dioxide, desorbing a major portion of the dissolved carbon dioxide and a portion of the dissolved chlorine at a temperature of from about 50° C. to about 100° C., and separately desorbing a further portion of chlorine from the solution at a temperature in excess of 125° C.

11. The process as described in claim 1 wherein the halogenated hydrocarbon is a liquid chloropropane having at least four chlorine atoms.

12. The process as described in claim 1 wherein the halogenated hydrocarbon is 1,1,2,3,3 pentachloropropane.

JOSEPH A. NEUBAUER.
THEODORE W. HEISKELL.

REFERENCES CITED

The following reference are of record in the file of this patent:

UNITED STATES PATENTS

| Number | Name | Date |
|---|---|---|
| 1,422,183 | Curme, Jr. | July 11, 1922 |
| 1,836,659 | Gordon | Dec. 15, 1931 |
| 2,381,092 | Wilson | Aug. 7, 1945 |
| 2,393,229 | Bouchard | Jan. 22, 1946 |

FOREIGN PATENTS

| Number | Country | Date |
|---|---|---|
| 386,052 | Great Britain | Jan. 12, 1933 |